(12) United States Patent
Terada (10) Patent No.: US 9,855,660 B2
(45) Date of Patent: Jan. 2, 2018

(54) TRAJECTORY GENERATION DEVICE, MOVING OBJECT, TRAJECTORY GENERATION METHOD

(71) Applicant: Koji Terada, Nagakute (JP)

(72) Inventor: Koji Terada, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/384,763

(22) PCT Filed: Mar. 14, 2013

(86) PCT No.: PCT/IB2013/000529
§ 371 (c)(1),
(2) Date: Sep. 12, 2014

(87) PCT Pub. No.: WO2013/140236
PCT Pub. Date: Sep. 26, 2013

(65) Prior Publication Data
US 2015/0100194 A1 Apr. 9, 2015

(30) Foreign Application Priority Data
Mar. 22, 2012 (JP) ................. 2012-065697

(51) Int. Cl.
*B25J 9/16* (2006.01)
*B25J 9/00* (2006.01)
*G05D 1/02* (2006.01)

(52) U.S. Cl.
CPC .......... *B25J 9/1666* (2013.01); *B25J 9/0003* (2013.01); *G05D 1/0214* (2013.01);
(Continued)

(58) Field of Classification Search
CPC ..... B25J 9/1666; B25J 9/0003; G05D 1/0214; G05B 2219/40428; G05B 2219/40431;
(Continued)

(56) References Cited

U.S. PATENT DOCUMENTS 5,506,774 A * 4/1996 Nobe ................. G01C 21/3446
701/423
5,530,791 A * 6/1996 Okabayashi ........... B25J 9/1666
700/255

(Continued)

FOREIGN PATENT DOCUMENTS

JP 04-340603 A 11/1992
JP 05-150804 A 6/1993
(Continued)

OTHER PUBLICATIONS

D. Berenson, et al., "A Robot Path Planning Framework that Learns from Experience," 2012 IEEE International Conference on Robotics and Automation, May 14, 2012, pp. 3671-3678.

*Primary Examiner* — Dale W Hilgendorf
(74) *Attorney, Agent, or Firm* — Andrews Kurth Kenyon LLP (57) ABSTRACT

A trajectory generation device includes a storage unit that stores a plurality of trajectories; a trajectory acquisition unit that acquires a trajectory, corresponding to an environment similar to a current environment, from the plurality of trajectories stored in the storage unit; and a trajectory generation unit that calculates a longest trajectory part, which is present in a moving object moving area in the trajectory acquired by the trajectory acquisition unit, and generates a trajectory by connecting both ends of the calculated longest trajectory part to a predetermined start point and a predetermined end point respectively.

6 Claims, 4 Drawing Sheets

(52) U.S. Cl.
CPC .............. *G05B 2219/40428* (2013.01); *G05B 2219/40431* (2013.01); *G05B 2219/40512* (2013.01); *G05B 2219/40516* (2013.01); *G05B 2219/40519* (2013.01); *Y10S 901/01* (2013.01); *Y10S 901/02* (2013.01)

(58) Field of Classification Search
CPC ........... G05B 2219/40516; G05B 2219/40512; G05B 2219/40519
See application file for complete search history.

(56) References Cited

U.S. PATENT DOCUMENTS

| | | | | |
|---|---|---|---|---|
| 5,899,955 | A * | 5/1999 | Yagyu | G01C 21/3446 701/410 |
| 5,931,888 | A * | 8/1999 | Hiyokawa | G01C 21/3415 701/428 |
| 5,999,881 | A * | 12/1999 | Law | G05D 1/0214 701/532 |
| 8,204,623 | B1 * | 6/2012 | Bhattacharyya | B25J 9/1666 700/245 |
| 2007/0179708 | A1 * | 8/2007 | Sekine | G01C 21/3446 701/532 |
| 2008/0125893 | A1 * | 5/2008 | Tilove | B25J 9/1666 700/103 |
| 2009/0326713 | A1 * | 12/2009 | Moriya | G05D 1/0274 701/25 |
| 2010/0017046 | A1 * | 1/2010 | Cheung | G05D 1/0274 701/26 |
| 2010/0168950 | A1 * | 7/2010 | Nagano | B25J 9/1666 701/25 |
| 2010/0174435 | A1 * | 7/2010 | Lim | G05D 1/0217 701/25 |
| 2011/0035051 | A1 * | 2/2011 | Kim | B25J 9/1666 700/246 |
| 2011/0035087 | A1 * | 2/2011 | Kim | B25J 9/1666 701/25 |
| 2011/0106306 | A1 * | 5/2011 | Kim | B25J 9/1664 700/246 |
| 2011/0106307 | A1 * | 5/2011 | Kim | G05D 1/0214 700/246 |
| 2011/0172818 | A1 | 7/2011 | Kim et al. | |
| 2011/0251783 | A1 * | 10/2011 | Doi | G01C 21/3446 701/532 |
| 2011/0264265 | A1 * | 10/2011 | Kanemoto | B25J 9/1666 700/252 |
| 2012/0101725 | A1 * | 4/2012 | Kondekar | A01B 79/005 701/445 |
| 2012/0165982 | A1 * | 6/2012 | Kim | B25J 9/162 700/255 |

FOREIGN PATENT DOCUMENTS

| | | |
|---|---|---|
| JP | 2001-166803 A | 6/2001 |
| JP | 2011-161624 A | 8/2011 |
| JP | 2011-230212 A | 11/2011 |

* cited by examiner

TRAJECTORY GENERATION DEVICE, MOVING OBJECT, TRAJECTORY GENERATION METHOD

CROSS-REFERENCE TO RELATED APPLICATIONS

This is a national phase application based on the PCT International Patent Application No. PCT/IB2013/000529 filed Mar. 14, 2013, claiming priority to Japanese patent application No. 2012-065697 filed Mar. 22, 2012, the entire contents of both of which are incorporated herein by reference.

BACKGROUND OF THE INVENTION

1. Field of the Invention

The invention relates to a trajectory generation device that generates a trajectory of a molding object such as a robot, a moving object and a trajectory generation method.

2. Description of Related Art In general, the trajectory generation of a robot arm is, for example, a search problem of about 6th to 20th dimensions that involves mathematical difficulty. In particular, the motion planning of a robot designed for use in the home environment is complex and, as the environment is constantly changing, the motion planning becomes more difficult.

To address this problem, a trajectory generation method is known in which a state with the smallest distance to a target state is selected from the states registered as the branches of a known-state registration tree and, from the selected state, a trajectory is calculated (see Japanese Patent Application Publication No. 2011-161624 (JP 2011-161624 A)).

SUMMARY OF THE INVENTION

However, one of the problems with the trajectory generation method disclosed in Japanese Patent Application Publication No. 2011-161624 (JP 2011-161624 A) is that, when a trajectory does not correspond to any known pattern, the registered information cannot be utilized efficiently in some cases with the result that a trajectory cannot be generated efficiently.

The present invention provides a trajectory generation device that generates a trajectory of a moving object more efficiently, a moving object and a trajectory generation method.

A first aspect of the invention is a trajectory generation device characterized by including a storage unit that stores a plurality of trajectories; a trajectory acquisition unit that acquires a trajectory, corresponding to an environment similar to a current environment, from the plurality of trajectories stored in the storage unit; and a trajectory generation unit that calculates a longest trajectory part, which is present in a moving object moving area in the trajectory acquired by the trajectory acquisition unit, and generates a trajectory by connecting both ends of the calculated longest trajectory part to a predetermined start point and a predetermined end point respectively. In this aspect, the trajectory generation unit may calculate a longest trajectory part that is present in a moving object moving area excluding an obstacle area and that satisfies a predetermined restriction condition, connect branches, one extending from the predetermined start point and another extending from the predetermined end point, to both ends of the calculated longest trajectory part respectively using a Rapidly-Exploring Random Tree (RRT) method, and generates the trajectory in a final form by smoothing the connected trajectory. In this aspect, the storage unit may store the trajectory and an evaluation of the trajectory and the trajectory acquisition unit may acquire a trajectory, which corresponds to an environment similar to the current environment and is highly evaluated, from the plurality of trajectories stored in the storage unit. In this aspect, the trajectory generation unit may calculate a longest trajectory part, which is present in a moving object moving area in each of a plurality of the trajectories acquired by the trajectory acquisition unit, generate trajectories, one for each of the plurality of acquired trajectories, by connecting both ends of the calculated longest trajectory part to a predetermined start point and a predetermined end point, evaluate each of the generated trajectories, and determine a final trajectory based on the evaluation of the trajectories. In this aspect, the evaluation may include at least one of an evaluation of a path length, an evaluation of a distance from an obstacle, an evaluation of consumption energy at a movement time, and an evaluation of user sensitivity. In this aspect, a moving object is possible that includes the trajectory generation device wherein the moving object moves based on a trajectory generated by the trajectory generation device. On the other hand, another aspect of the present invention is a trajectory generation method characterized by including acquiring a trajectory, corresponding to an environment similar to a current environment, from a plurality of trajectories stored in a storage unit; and calculating a longest trajectory part, which is present in a moving object moving area in the acquired trajectory and generating a trajectory by connecting both ends of the calculated longest trajectory part to a predetermined start point and a predetermined end point respectively.

The present invention can provide a trajectory generation device that generates a trajectory of a moving object more efficiently, a moving object, and a trajectory generation method.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
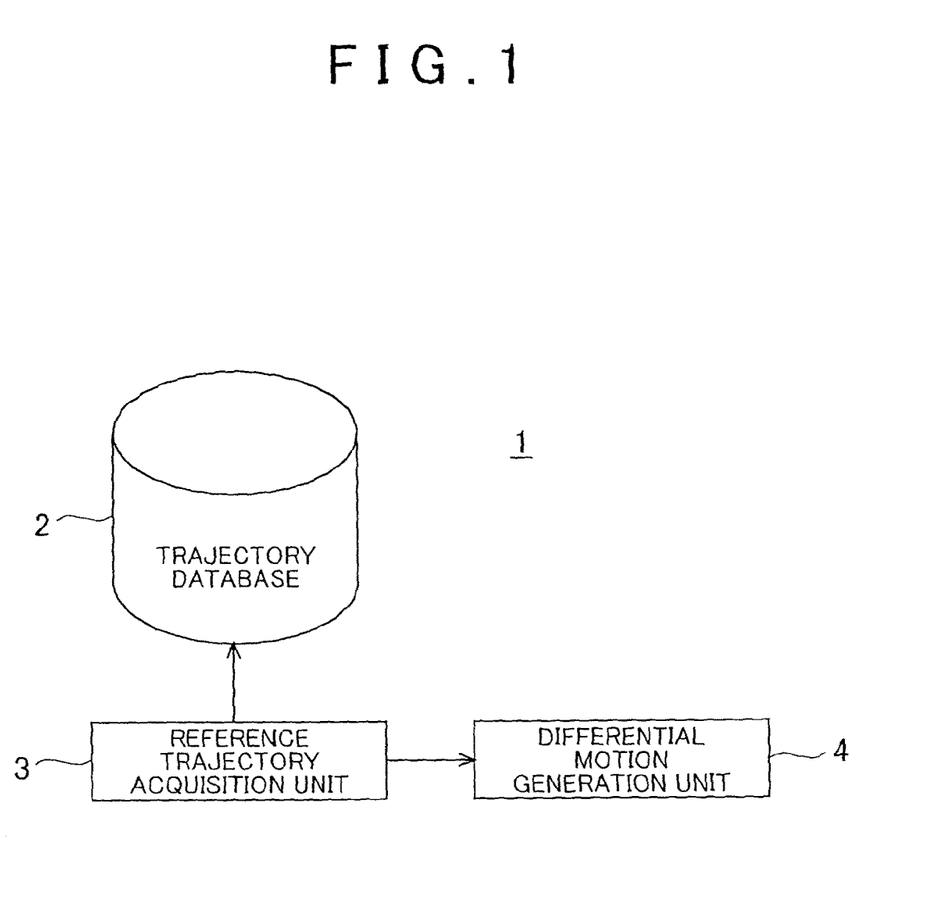
FIG. 1 is a block diagram showing a general system configuration of a trajectory generation device in one embodiment of the present invention.

An embodiment of the present invention is described below with reference to the drawings. FIG. 1 is a block diagram showing a general system configuration of a trajectory generation device in one embodiment of the present invention. A trajectory generation device 1 in this embodiment, which generates a trajectory of a moving object such as a robot or a robot arm, is mounted on a moving object. A moving object, such as a robot, moves according to a trajectory generated by the trajectory generation device 1.

The trajectory generation device 1 includes a trajectory database 2 that stores a plurality of trajectories in advance, a reference trajectory acquisition unit 3 that acquires a reference trajectory from the trajectory database 2, and a differential motion generation unit 4 that generates a trajectory based on an acquired reference trajectory.

The hardware of the trajectory generation device 1 is configured mainly by a microcomputer. The microcomputer includes a central processing unit (CPU) that performs control processing and operation processing, a read only memory (ROM) that stores a control program and an operation program executed by the CPU, and a random access memory (RAM) that temporarily stores data to be processed. The CPU, ROM, and RAM are interconnected by a data bus.

The trajectory database 2, one example of a storage unit, is configured by the ROM or RAM described above. The trajectory database 2 stores a plurality of trajectories each represented in the form of a correspondence among a motion planning input for an arm motion planning problem of a robot, a motion planning output, and the evaluation of the motion planning output. The arm motion planning problem refers to a problem that receives an input (motion planning input), such as environment information, a robot model, a restriction condition, and a basic planning condition necessary for a robot to perform a desired motion, and calculates time-series data on the joint angles (motion planning output) necessary for an actual robot motion.

The environment information is information based on a model, information based on actual data, or a combination of these two types of information. The information based on a model refers to information by which the shape can be clearly recognized in advance by drawings, for example, data on a position/pose and an object type. The information based on actual data refers to information in which voxels, obtained by a 3D sensor, are used as environment data.

The robot model described above includes kinematics information (joint position relation, axial direction), geometric information (robot shape, etc.,) and dynamics information (weight, maximum torque, etc.). The restriction condition described above includes a holding object (object held in the planning), a tilting restriction (orientation of hands for holding a holding object), an output torque (maximum output torque of a motor), and robot position/pose (position and pose of a robot in the environment). The basic planning condition includes an initial joint angle, a terminal joint angle, and a robot position/pose.

The motion planning output, which is time-series data on the joint angles necessary for the robot to actually move, is expressed by expression (1) given below.

[Math. 1]

$$\theta \in R^n$$

$$\Theta = [\theta(t_0), \theta(t_1), \ldots, \theta(t_m)] \quad \text{Expression (1)}$$

In expression (1) given above, θ is a joint angle vector, n is the number of joints, Θ is an arm trajectory, t is a time, and m is the number of trajectories.

Each time arm motion planning is performed (each time an arm motion problem is solved), a correspondence among a motion planning input to the arm motion planning problem, a motion planning output, and the evaluation of the motion planning output is stored in the trajectory database 2 automatically or by the user.

The reference trajectory acquisition unit 3, one example of a trajectory acquisition unit, acquires a trajectory, which corresponds to an environment similar to the current environment, from a plurality of trajectories stored in the trajectory database 2. For example, as the initial value of the arm motion planning problem to be solved, the reference trajectory acquisition unit 3 selects a trajectory from the trajectory database 2. The trajectory selected in this case is a trajectory whose motion planning input (for example, the current environment such as the position/pose of robot, object type, and object position) is similar to that of the arm motion planning problem to be solved and whose motion planning output is highly evaluated. The reference trajectory acquisition unit 3 outputs the selected trajectory to the differential motion generation unit 4 as a reference trajectory. As described above, when a trajectory, whose environment is similar to the current environment and whose output is highly evaluated, is stored in the trajectory database 2 in advance, using such a trajectory enables efficient trajectory generation.

The following describes in detail a method used by the reference trajectory acquisition unit 3 to compare the two motion planning inputs, one is the motion planning input of an arm motion planning problem to be solved and the other is a motion planning input stored in the trajectory database 2 and, based on the comparison result, select a trajectory, corresponding to the motion planning input most similar to that of the arm motion planning problem to be solved, from the trajectory database 2.

For example, the reference trajectory acquisition unit 3 uses the function given below to compare the position/pose of a robot between the two motion planning inputs. The position/pose of a robot in the motion planning input is represented by expression (2) given below, for example, using a quaternion, while the position/pose of an object is represented by expression (3) given below.

$$T_{robot\_initial} = [x, y, z, r_x, r_y, r_z, r_w] \quad \text{Expression (2)}$$

$$T_{objectXX\_pos} = [x, y, z, r_x, r_y, r_z, r_w] \quad \text{Expression (3)}$$

Although the position/pose is represented by a quaternion, the present invention is not limited to this representation. The position/pose may also be represented by an Euler angle or a rotation matrix or by any other representation method.

$$L_{pose}(T_1, T_2) = w_p \|p_1 - p_2\| + w_r \|\text{angle}(r_1, r_2)\| \quad \text{Expression (4)}$$

In expression (4) given above, $T_1$ is the position/pose to be compared, $T_2$ is the position/pose to compare, $p_1$ is parallel position of $T_1$, $p_2$ is the parallel position of $T_2$, $r_1$ is the quaternion of $T_1$, $r_2$ is the quaternion of $T_2$, $w_p$ is the weight on parallel translation, $w_r$ is the weight on the rotation direction, and angle 0 is the function that returns the rotation angle between the two quaternions.

The reference trajectory acquisition unit 3 compares the robot's environment information between the two motion planning inputs using the functions represented by expression (5) and expression (6) given below.

For the model-based environment information, the reference trajectory acquisition unit 3 uses expression (5) given below to compare the object presence vector O, which represents what object is in the environment using 1 and 0, and to compare the pose of each object, between the two motion planning inputs. In addition, a representation (for example, the sofa is near the chair) may be added based on the similarity in an object. Object presence vector O=[0, 1, 0, ... ]

[Math. 2]

$$L_{env}(O_1, O_2) = \sum_i !\,(O_1(i) \oplus O_2(i))$$

Expression (5)

In expression (5) given above, $O_1$ is the object presence vector to be compared and $O_2$ is the object presence vector to compare.

On the other hand, for the environment information based on actual data in which the environment information is given directly by vectors in most cases, the reference trajectory acquisition unit 3 uses expression (6) given below for the comparison by directly using vectors. The reference trajectory acquisition unit 3 may also use the integrated value (number of units) of voxels or a feature extracted value, such as flatness, for the comparison.

$$L_{env}(B_1, B_2) = \|B_1, B_2\|$$

Expression (6)

In expression (6) given above, $B_1$ and $B_2$ each indicate the vector of a voxel. As described above, the reference trajectory acquisition unit 3 uses expression (7), which indicates the similarity of the motion planning inputs, to compare the motion planning input of the arm motion planning problem to be solved and the motion planning input stored in the trajectory database 2 to select the most similar motion planning input.

The similarity between the motion planning inputs given below is calculated by adding together the value, calculated by multiplying the similarity in each piece of environment information by a weight and then cumulatively adding up the resulting values, and the value calculated by multiplying the similarity in each position/pose by a weight and then cumulatively adding up the resulting values.

[Math 3]

$$L_{input}(I_1, I_2) = \sum_i w_i L_{env}(i) + \sum_j w_j L_{pose}(j)$$

Expression (7)

In expression (7) given above, $I_1$ is the motion planning input of the arm motion planning problem to be solved, and $I_2$ is the motion planning input stored in the trajectory database 2. The larger the calculated value is, the lower the similarity between the motion planning inputs is. Therefore, the reference trajectory acquisition unit 3 selects a similar motion planning input, whose calculated value of expression, (7) is smallest (that is, highest similarity), from the trajectory database 2.

In expression (7), the similarity may also be calculated by multiplying the similarity in each restriction condition by a weight and then cumulatively adding up the resulting values or by multiplying the similarity in the robot model by a weight and then cumulatively adding up the resulting values. This enables the similarity between the motion planning inputs to be calculated more accurately.

Next, the following describes the evaluation of a motion planning output (an arm trajectory, represented by time-series joint angles, that is necessary when a robot moves). For better efficiency, it is generally believed that the shorter an arm trajectory is, the shorter the operation time is. Therefore, to evaluate the motion planning output, expression (8) given below is used to evaluate the integrated value of the path along the arm trajectory.

[Math 4]

$$E_{length}(\Theta) = \exp\left(-\sum_i \|\theta_{i+1} - \theta_i\|\right)$$

Expression (8)

In an actual arm operation, the arm may mistakenly collide with an obstacle due to a recognition error or a modeling error. Considering this, it is also possible to give a better evaluation when the evaluation of the nearest point to an obstacle is higher.

A lower consumption energy required for an arm operation has a merit that the consumption power is reduced. Considering this, the evaluation of the total energy required for arm trajectory generation may be added to the evaluation of the path-integrated value described above. In addition, the user's sensitivity evaluation, or a combination of any evaluations described above, may be added to the evaluation of the path-integrated value described above. Adding these factors to the evaluation increases the accuracy of the evaluation.

For example, taking all these evaluations into account, expression (9) given below may be used to make a comprehensive evaluation of the motion planning output.

[Math 5]

$$E(\Theta) = \sum_i w_i E_i(\Theta)$$

Expression (9)

Figure 2:
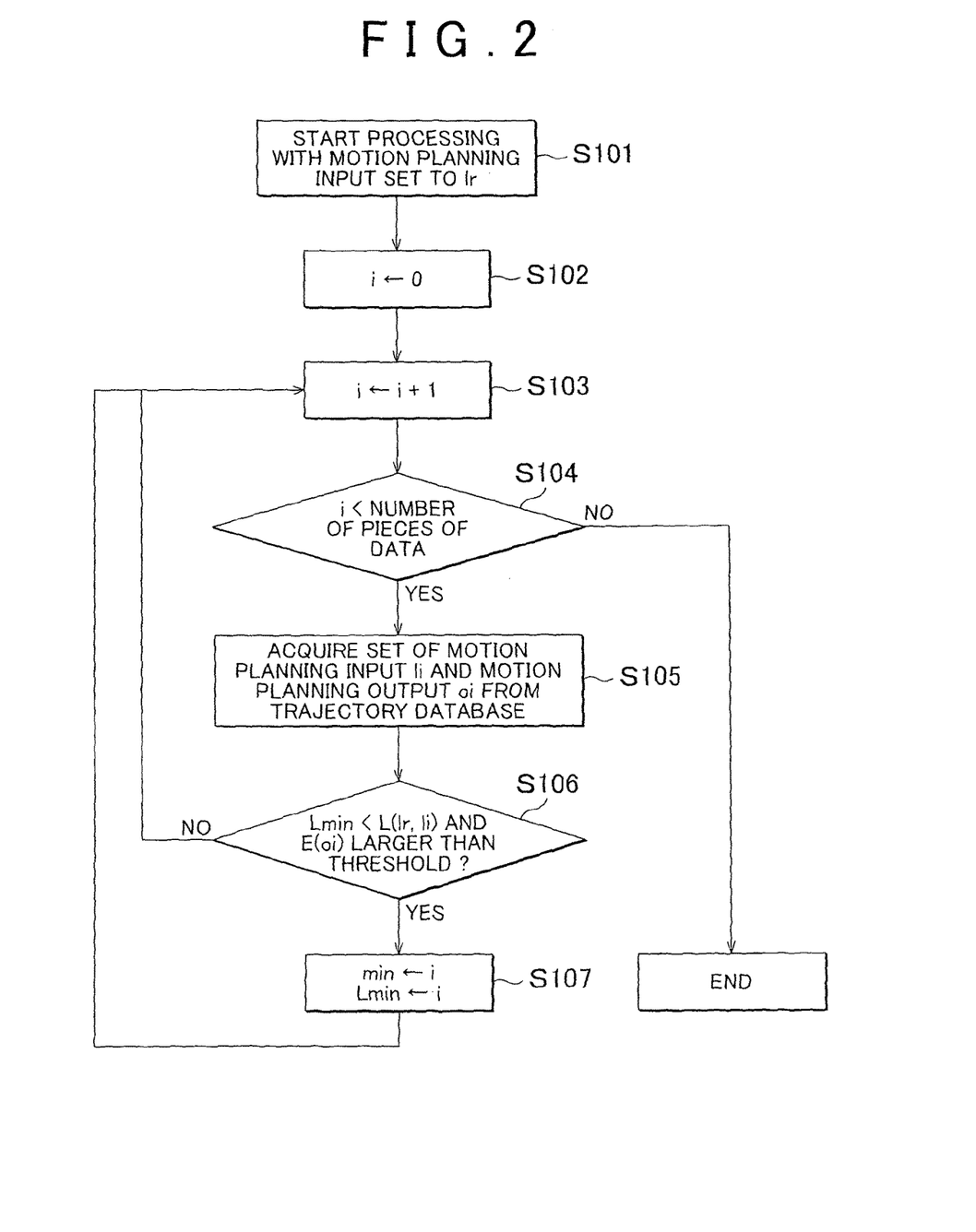
FIG. 2 is a flowchart showing a method for selecting a trajectory, whose motion planning input is similar to the motion planning input of an arm motion planning problem to be solved and whose evaluation of the motion planning output is high, from a trajectory database.

FIG. 2 is a flowchart showing a method used by the reference trajectory acquisition unit 3 for selecting a trajectory, whose motion planning input is similar to the motion planning input of an arm motion planning problem to be solved and whose evaluation of the motion planning output is high, from the trajectory database 2.

First, the reference trajectory acquisition unit 3 sets the motion planning input to $I_r$ (step S101), sets the initial value of parameter i to 0 (step S102), and increments parameter i by 1 (step S103).

Next, if it is determined that parameter i is smaller than the number of pieces of data stored in the trajectory database 2 (number of trajectories stored in advance) (YES in step S104), the reference trajectory acquisition unit 3 acquires motion planning input $I_i$ and motion planning output $O_i$ from the trajectory database 2 (step S105). On the other hand, if it is determined that parameter i is equal to or larger than the number of pieces of data stored in the trajectory database 2 (NO in step S104), the reference trajectory acquisition unit 3 terminates the processing.

After that, the reference trajectory acquisition unit 3 determines whether the similarity $L_{input}(I_r, I_i)$ is larger than the predetermined value $L_{min}$ and the evaluation value $E(O_i)$ is larger than the threshold (step S106). if it is determined that the similarity $L_{input}(I_r, I_i)$ is larger than the predetermined value $L_{min}$ and the evaluation value $E(O_i)$ is larger than the threshold (YES in step S106), the reference trajectory acquisition unit 3 assigns the value of parameter i to min and to $L_{min}$ (step S107), and then returns control to the above processing (step S103).

The differential motion generation unit 4, one example of a trajectory generation unit, performs differential processing described below based on the reference trajectory (motion planning output, i.e., an approximate trajectory for the arm motion planning problem to be solved) acquired from the reference trajectory acquisition unit 3 and generates a new trajectory.

The differential motion generation unit 4 uses the Differential Bi-Directional Rapidly-Exploring Random Tree (DBiRRT) method (hereinafter simply called RRT method) that is an extended version of RRT-Connect. Using this method, the differential motion generation unit 4 extracts a longest possible trajectory part from the trajectory, acquired by the reference trajectory acquisition unit 3, to efficiently generate a trajectory.

More specifically, the differential motion generation unit 4 calculates a longest trajectory part that is present in the robot moving area excluding an obstacle area and that satisfies a predetermined restriction condition. Then, the differential motion generation unit 4 uses the RRT method to connect the branches, one extending from the start point and the other extending from the end point, to each of the both ends of the calculated longest trajectory part and smoothes the connected trajectory to generate the final trajectory. The trajectory generation method according to the DBiRRT method is described in detail below.

Figure 3A:
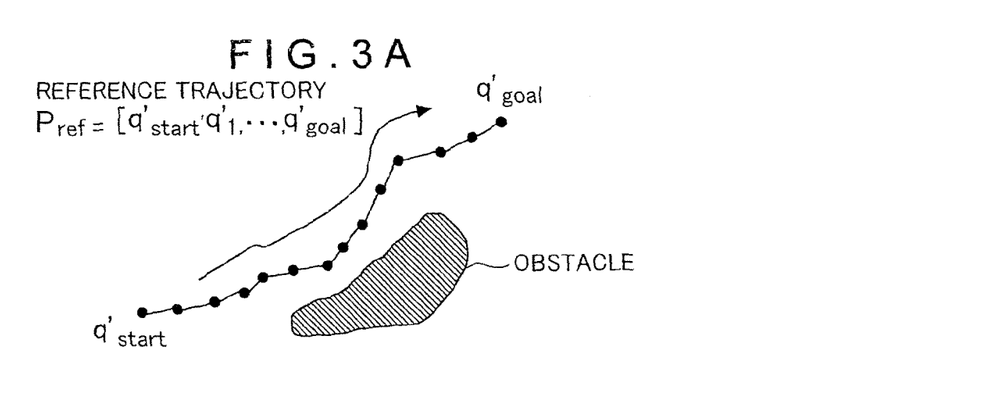
FIG. 3A is a diagram showing a trajectory generation method according to the DBiRRT method.
Figure 3B:
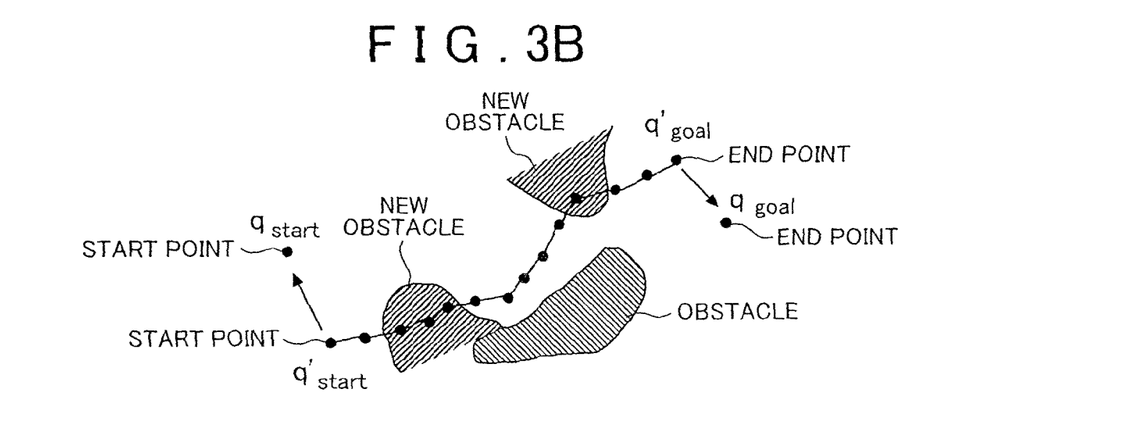
FIG. 3B is a diagram showing a trajectory generation method according to the DBiRRT method.

First, the differential motion generation unit 4 acquires a reference trajectory $(P_{ref}=q'_{start}, q'_1, \ldots, q'_{goal})$ from the reference trajectory acquisition unit 3 (FIG. 3A). Next, the differential motion generation unit 4 applies the reference trajectory, acquired from the reference trajectory acquisition unit 3, to the arm motion planning problem to be solved (FIG. 3B). At this point, note that the robot cannot move along the reference trajectory. This is because there are new obstacles associated with the arm motion planning problem to be solved and because the start point and the end point of the acquired reference trajectory differ respectively from the start point $(q_{start})$ and the end point $(q_{goal})$ of the arm motion planning problem to be solved.

Figure 3C:
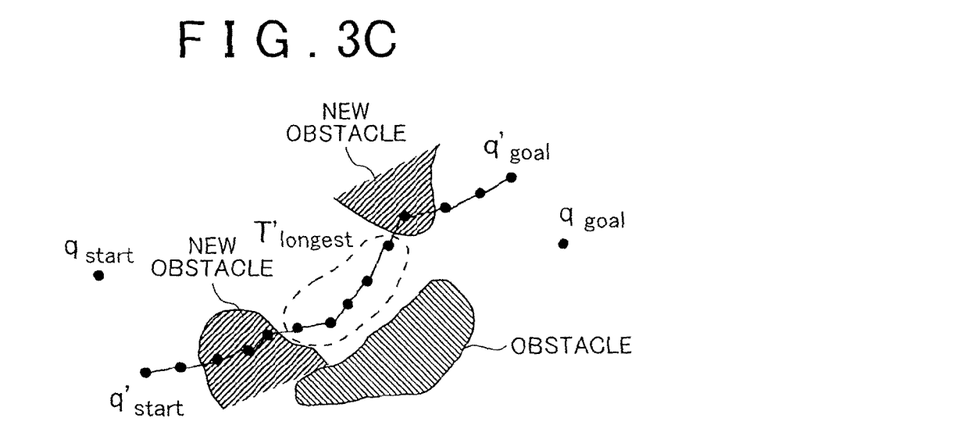
FIG. 3C is a diagram showing a trajectory generation method according to the DBiRRT method.

After that, in the reference trajectory, the differential motion generation unit 4 calculates the longest trajectory part T'longest (trajectory part included in the dotted-line frame) that is present in a robot moving area excluding the obstacle area and that satisfies a predetermined restriction condition (for example, maximum or minimum joint angle, maximum joint torque, etc.) (FIG. 3C).

Figure 4A:
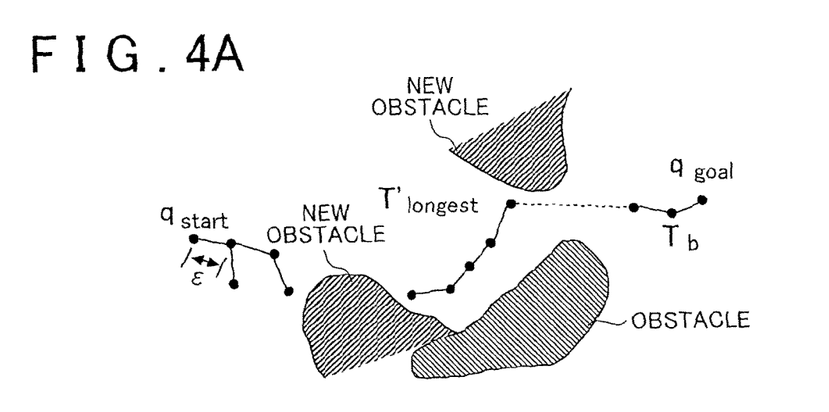
FIG. 4A is a diagram showing a trajectory generation method according to the DBiRRT method.
Figure 4B:
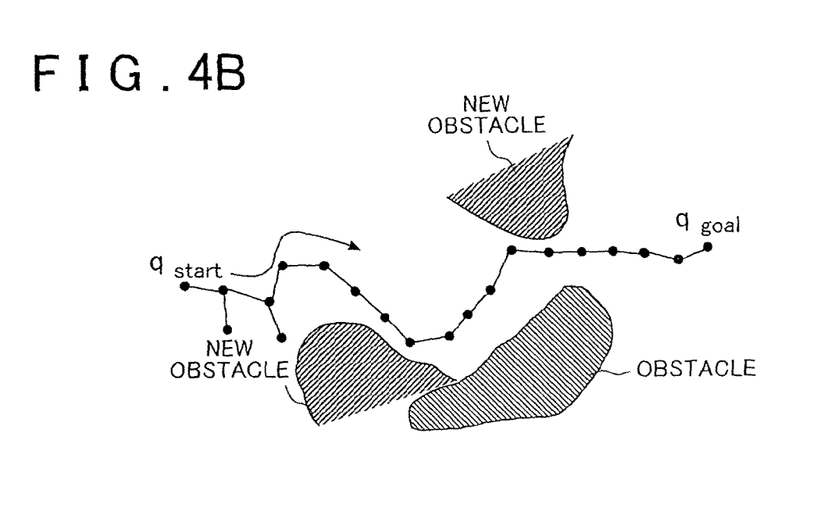
FIG. 4B is a diagram showing a trajectory generation method according to the DBiRRT method.
Figure 4C:
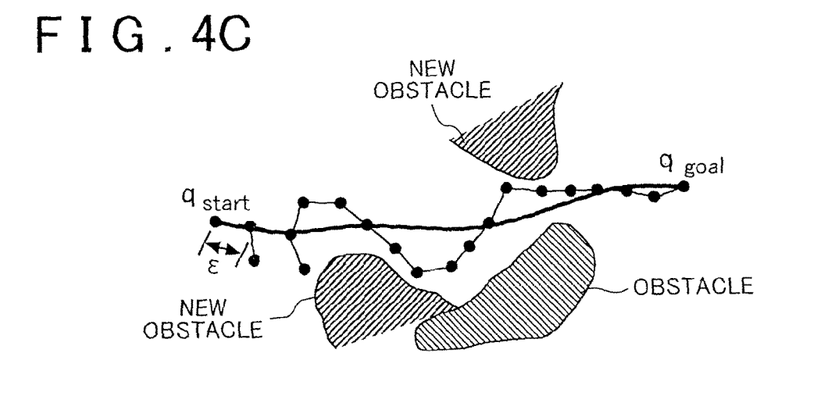
FIG. 4C is a diagram showing a trajectory generation method according to the DBiRRT method.

In addition, the differential motion generation unit 4 extends the branches, one extending from the start point ($\epsilon$) (and the other extending from the end point $(T_b)$ using the DBiRRT method and connects them respectively to the ends of the calculated trajectory part T'longest (FIG. 4A). The differential motion generation unit 4 determines the trajectory, generated by the connection described above, as a temporarily solved trajectory (FIG. 4B). Finally, the differential motion generation unit 4 smoothes the temporarily solved trajectory to make it shorter and determines the smoothed trajectory as the finally solved trajectory (FIG. 4C). The differential motion generation unit 4 performs the differential processing as described above and generates a new trajectory to generate a reliable trajectory quickly.

Note that, the reference trajectory acquisition unit 3 may select a plurality of trajectories as reference trajectories, each corresponding to a motion planning input similar to the motion planning input of the arm motion planning problem to be solved and each corresponding to a highly-evaluated motion planning output, from the trajectory database 2.

In this case, the differential motion generation unit 4 performs the differential processing for the plurality of reference trajectories, acquired by the reference trajectory acquisition unit 3, as described above to generate a plurality of trajectories. After that, the differential motion generation unit 4 evaluates each generated trajectory as described above to determine the final trajectory.

At this time, the differential motion generation unit 4 may instantly determine a trajectory, which is one of the generated trajectories and is selected first, as the final trajectory. This generation method may be used to generate a trajectory more quickly in a complex environment. The differential motion generation unit 4 may also determine a trajectory, which is one of the generated trajectories and whose evaluation value is highest, as the final trajectory. This generation method may be used to generate a more optimal trajectory. In addition, the differential motion generation unit 4 may determine a trajectory, which is one of the generated trajectories and whose evaluation value is higher, than a predetermined value, as the final trajectory. This generation method may be used to generate a trajectory with a certain level of evaluation while reducing the trajectory generation time.

As described above, the reference trajectory acquisition unit 3 of the trajectory generation device 1 according to this embodiment acquires a reference trajectory, whose motion planning input is similar to the motion planning input of the motion planning problem to be solved and whose motion planning output is highly evaluated, from the trajectory database 2. After that, the differential motion generation unit 4 calculates the longest trajectory part that is in the robot moving area excluding the obstacle area and satisfies a predetermined restriction condition. Then, using the RRT method, the differential motion generation unit 4 connects the branches, one extending from a predetermined start point and the other extending from a predetermined end point, to the both ends of the calculated longest trajectory part respectively to generate a final trajectory. In this way, the trajectory generation device 1 can generate the trajectory of a moving object more efficiently.

It is to be understood that the present invention is not limited to the embodiment described above but may be changed as necessary without departing from the spirit of the present invention. For example, though the generation of a trajectory of a robot arm is described in the embodiment above, the present invention is applicable also to the generation of a trajectory of any moving object.

Although described as a hardware configuration in the embodiment above, the present invention is not limited thereto. For example, the present invention may also be implemented by causing the CPU to execute the processing of the reference trajectory acquisition unit 3 and the differential motion generation unit 4.

The program may be stored in various types of non-transitory computer readable medium for distribution to a computer. A non-transitory computer readable medium includes various types of tangible storage medium. Examples of a non-transitory computer readable storage medium include a magnetic recording medium (for example, flexible disk, magnetic tape, hard disk drive), a magneto optic recording medium (for example, optical magnetic disc), a compact disc read only memory (CD-ROM), a CD recordable (CD-R), a CD-ReWritable (CD-R/W), and a semiconductor memory (for example, mask ROM, programmable ROM (PROM), Erasable PROM (EPROM), flash ROM, and random access memory (RAM)). The program may also be distributed to a computer via various types of transitory computer readable medium. Examples of transitory computer readable medium include electric signals, optical signals, and electromagnetic waves. A transitory computer readable medium allows the program to be distributed to a computer via a wired communication line such as an electric wire and an optical fiber or via a wireless communication line.

The present invention is applicable, for example, to a trajectory generation device that quickly generates a trajectory of a moving object such as a robot arm.

The invention claimed is:

1. A moving object trajectory generation device, comprising:
a control unit including a central processing unit that performs control processing, the control unit configured to:
store a plurality of moving object trajectories, wherein each of the plurality of moving object trajectories corresponds to a stored motion planning input among a plurality of stored motion planning inputs;
acquire a trajectory of a moving object corresponding to a motion planning input and compare the acquired motion planning input with each of the plurality of the stored motion planning inputs in order to determine a corresponding reference moving object trajectory among the plurality of moving object trajectories stored, wherein the reference moving object trajectory includes at least one through-obstacle portion and at least one unobstructed portion of the trajectory; and
extract a longest unobstructed portion from the reference moving object trajectory determined by the control unit,
generate a connection trajectory by connecting both ends of the extracted longest unobstructed trajectory part to a predetermined start point and a predetermined end point respectively, and
wherein the moving object moves based on the connection trajectory generated by the control unit.

2. The moving object trajectory generation device according to claim 1,
wherein the control unit calculates the longest unobstructed trajectory part that is present in the moving object moving area excluding the obstacle area and that satisfies a predetermined restriction condition, connects branches, one extending from the predetermined start point and another extending from the predetermined end point, to both ends of the extracted longest unobstructed trajectory part respectively using a Rapidly-Exploring Random Tree method, and generates a final trajectory in a final form by smoothing the connection trajectory.

3. The moving object trajectory generation device according to claim 1,
wherein control unit stores the trajectory and an evaluation of the trajectory and acquires the trajectory, which corresponds to an environment similar to a current environment, and is compared to, and evaluated based on, the plurality of trajectories stored in the control unit.

4. The moving object trajectory generation device according to claim 3,
wherein the evaluation includes at least one of an evaluation of a path length, an evaluation of a distance from an obstacle, an evaluation of consumption energy at a movement time, and an evaluation of user sensitivity.

5. The moving object trajectory generation device according to claim 1,
wherein the control unit calculates the longest unobstructed trajectory part, which is present in the moving object moving area in each of the plurality of the trajectories acquired by the control unit, generates the connection trajectories each of which is generated by connecting both ends of the extracted longest unobstructed trajectory part for the corresponding acquired trajectory to the predetermined start point and the predetermined end point, evaluates each of the generated trajectories, and determines a final trajectory based on the evaluation of the trajectories.

6. A trajectory generation method for a robot, comprising:
acquiring a trajectory by a control unit, corresponding to an environment similar to a current environment, from a plurality of trajectories stored in a storage unit, wherein the acquired trajectory includes at least one through-obstacle portion and at least one unobstructed portion of the trajectory, and;
extracting a longest unobstructed portion from the acquired trajectory, which is present in a moving area of an arm of the robot within the acquired trajectory by the control unit; and
generating a connection trajectory by the control unit by connecting both ends of the extracted longest unobstructed trajectory part to a predetermined start point and a predetermined end point respectively, and
moving the robot based on the connection trajectory generated by the control unit.

* * * * *